US012682658B2

(12) United States Patent
Wakayama et al.

(10) Patent No.: US 12,682,658 B2
(45) Date of Patent: Jul. 14, 2026

(54) WHITE LINE RECOGNITION DEVICE, MOBILE OBJECT CONTROL SYSTEM, AND WHITE LINE RECOGNITION METHOD

(71) Applicant: HONDA MOTOR CO., LTD., Tokyo (JP)

(72) Inventors: Ryoji Wakayama, Wako (JP); Takashi Matsumoto, Wako (JP); Hideki Matsunaga, Wako (JP); Koki Aizawa, Wako (JP); Kento Shirakata, Wako (JP); Yunosuke Kuramitsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 407 days.

(21) Appl. No.: 18/125,164

(22) Filed: Mar. 23, 2023

(65) Prior Publication Data

US 2023/0316779 A1 Oct. 5, 2023

(30) Foreign Application Priority Data

Mar. 29, 2022 (JP) ................................. 2022-053188

(51) Int. Cl.
*G06V 20/56* (2022.01)
*B60W 10/20* (2006.01)
*G01B 11/02* (2006.01)

(52) U.S. Cl.
CPC ........... *G06V 20/588* (2022.01); *B60W 10/20* (2013.01); *G01B 11/026* (2013.01); *G06T 2207/30256* (2013.01)

(58) Field of Classification Search
CPC .... G06V 20/588; G06V 10/809; G06V 20/58; G06V 10/44; G06V 10/764; B60W 10/20; G01B 11/026; G06T 2207/30256
See application file for complete search history.

(56) References Cited

U.S. PATENT DOCUMENTS 7,949,190 B2 * 5/2011 Wu ........................ G06V 20/58
382/104
8,537,338 B1 * 9/2013 Medasani ............. G01S 7/4802
382/104

(Continued)

FOREIGN PATENT DOCUMENTS

CN 108229406 6/2018
CN 110770741 2/2020

(Continued)

OTHER PUBLICATIONS

Japanese Office Action for Japanese Patent Application No. 2022-053188 mailed Apr. 25, 2025.

(Continued)

*Primary Examiner* — Solomon G Bezuayehu
(74) *Attorney, Agent, or Firm* — Amin, Turocy & Watson, LLP

(57) ABSTRACT

A white line recognition device includes a storage medium storing computer-readable instructions and a processor connected to the storage medium, the processor executing the computer-readable instructions to recognize a linear feature located in an image captured by a monocular camera as a contour of a white line drawn on a road surface, and detect a linear object located at a distance from the road surface based on an output of a distance measurement sensor provided to have at least a detection range in the same direction as the monocular camera. Recognizing the linear feature includes preventing the linear feature from being recognized as the contour of the white line.

4 Claims, 5 Drawing Sheets

(56) References Cited

U.S. PATENT DOCUMENTS

| | | | | |
|---|---|---|---|---|
| 9,530,062 | B2 * | 12/2016 | Nguyen | G06V 10/803 |
| 10,303,958 | B2 * | 5/2019 | Springer | G06T 7/97 |
| 10,816,993 | B1 * | 10/2020 | Tran | G06N 3/045 |
| 11,138,447 | B2 * | 10/2021 | Dahal | G06V 20/588 |
| 11,195,028 | B2 * | 12/2021 | Lee | G06V 10/60 |
| 2002/0042676 | A1 * | 4/2002 | Furusho | G05D 1/0246 |
| | | | | 701/300 |
| 2002/0159616 | A1 * | 10/2002 | Ohta | G06V 20/588 |
| | | | | 382/104 |
| 2002/0191837 | A1 * | 12/2002 | Takeda | G08G 1/166 |
| | | | | 382/104 |
| 2003/0072471 | A1 * | 4/2003 | Otsuka | G06V 10/44 |
| | | | | 382/103 |
| 2003/0103650 | A1 * | 6/2003 | Otsuka | G06T 7/73 |
| | | | | 348/148 |
| 2004/0113818 | A1 * | 6/2004 | Yokokohji | G06T 7/277 |
| | | | | 345/7 |
| 2006/0132295 | A1 * | 6/2006 | Gern | B60Q 9/008 |
| | | | | 340/438 |
| 2009/0039261 | A1 * | 2/2009 | Toyoda | H10P 74/203 |
| | | | | 250/310 |
| 2010/0110193 | A1 * | 5/2010 | Kobayashi | G06V 20/58 |
| | | | | 348/149 |
| 2012/0323473 | A1 * | 12/2012 | Irie | B60W 30/12 |
| | | | | 701/117 |
| 2013/0027511 | A1 * | 1/2013 | Takemura | G06V 20/588 |
| | | | | 348/42 |
| 2013/0314272 | A1 * | 11/2013 | Gross | G01S 13/931 |
| | | | | 342/70 |
| 2014/0320637 | A1 * | 10/2014 | Yi | G06V 20/56 |
| | | | | 348/118 |
| 2015/0294164 | A1 * | 10/2015 | Sakamoto | G06V 20/588 |
| | | | | 382/104 |
| 2015/0332100 | A1 * | 11/2015 | Yamaguchi | G06V 10/147 |
| | | | | 348/142 |
| 2015/0332101 | A1 * | 11/2015 | Takaki | G08G 1/167 |
| | | | | 382/104 |
| 2015/0332114 | A1 * | 11/2015 | Springer | B60W 50/14 |
| | | | | 348/148 |
| 2016/0012300 | A1 * | 1/2016 | Tsuruta | G06F 18/22 |
| | | | | 382/104 |
| 2016/0026879 | A1 * | 1/2016 | Maeda | G06V 20/588 |
| | | | | 382/104 |
| 2016/0110616 | A1 * | 4/2016 | Kawasaki | G06V 20/588 |
| | | | | 382/103 |
| 2016/0133130 | A1 * | 5/2016 | Grimm | G08G 1/0129 |
| | | | | 340/905 |
| 2016/0173831 | A1 * | 6/2016 | Akamine | G06V 20/588 |
| | | | | 348/149 |
| 2016/0180177 | A1 * | 6/2016 | Nguyen | G06V 10/42 |
| | | | | 382/104 |
| 2017/0068862 | A1 * | 3/2017 | Mueter | H04N 7/181 |
| 2018/0012084 | A1 * | 1/2018 | Okano | G06V 20/588 |
| 2018/0189578 | A1 * | 7/2018 | Yang | G01C 21/3635 |
| 2018/0365502 | A1 * | 12/2018 | Stein | G06T 7/74 |
| 2019/0049724 | A1 * | 2/2019 | Kimura | H04N 5/265 |
| 2019/0092325 | A1 * | 3/2019 | Oka | B60R 21/00 |
| 2019/0279004 | A1 * | 9/2019 | Kwon | G06V 20/588 |
| 2019/0279581 | A1 * | 9/2019 | Furuta | G02F 1/13471 |
| 2019/0347491 | A1 * | 11/2019 | Kurian | G06F 18/241 |
| 2020/0218908 | A1 * | 7/2020 | Lee | G06V 10/82 |
| 2020/0240806 | A1 * | 7/2020 | Daikoku | G08G 1/167 |
| 2020/0410256 | A1 * | 12/2020 | Bayer | G06T 7/13 |
| 2021/0142659 | A1 * | 5/2021 | Chen | G08G 1/0141 |
| 2021/0182560 | A1 * | 6/2021 | Richards | G06T 7/73 |
| 2021/0331671 | A1 * | 10/2021 | Kumano | B60W 30/12 |
| 2022/0234623 | A1 * | 7/2022 | Oh | B60W 40/072 |
| 2022/0281456 | A1 * | 9/2022 | Giovanardi | G08G 1/0112 |
| 2023/0280184 | A1 * | 9/2023 | Keski-Valkama | |
| | | | | G01C 21/3819 |
| | | | | 701/25 |
| 2023/0298362 | A1 * | 9/2023 | Zhang | G06T 7/12 |
| | | | | 382/103 |
| 2023/0351755 | A1 * | 11/2023 | Chan | G06V 10/774 |

FOREIGN PATENT DOCUMENTS

| | | |
|---|---|---|
| JP | 2019-190975 | 10/2019 |
| JP | 2020-144777 | 9/2020 |
| JP | 2021-047609 | 3/2021 |
| JP | 2021-135596 | 9/2021 |

OTHER PUBLICATIONS

Chinese Office Action for Chinese Patent Application No. 202310273487.X mailed Oct. 22, 2025.

1 Chinese Office Action for Chinese Patent Application No. 202310273487.X mailed Feb. 28, 2026.

* cited by examiner

WHITE LINE RECOGNITION DEVICE, MOBILE OBJECT CONTROL SYSTEM, AND WHITE LINE RECOGNITION METHOD

CROSS-REFERENCE TO RELATED APPLICATION

Priority is claimed on Japanese Patent Application No. 2022-053188, filed Mar. 29, 2022, the content of which is incorporated herein by reference.

BACKGROUND

Field of the Invention

The present invention relates to a white line recognition device, a mobile object control system, and a white line recognition method.

Description of Related Art

In the related art, an invention in which a linear object is extracted from a camera image to extract a step is disclosed (Japanese Unexamined Patent Application, First Publication No. 2021-135596). Also, an invention in which roadways, center lines, white lines, curbs, and sidewalks are extracted from three-dimensional point group data is disclosed (Japanese Unexamined Patent Application, First Publication No. 2019-190975).

SUMMARY

Although practical applications of mobile objects that can move not only on roadways but also on sidewalks have been promoted in recent years, the possibility of misrecognition of white lines, especially in spaces involving sidewalks, has not been sufficiently studied in the related art.

The present invention has been made in consideration of the above-described circumstances and an objective of the present invention is to provide a white line recognition device, a mobile object control system, and a white line recognition method capable of suppressing the misrecognition of white lines.

A white line recognition device, a mobile object control system, and a white line recognition method according to the present invention adopt the following configurations.

(1): According to an aspect of the present invention, there is provided a white line recognition device including: a white line recognizer configured to recognize a linear feature located in an image captured by a monocular camera as a contour of a white line drawn on a road surface, and a linear object detector configured to detect a linear object located at a distance from the road surface based on an output of a distance measurement sensor provided to have at least a detection range in the same direction as the monocular camera, wherein the white line recognizer prevents the linear feature corresponding to a position of the linear object from being recognized as the contour of the white line.

(2): In the above-described aspect (1), the white line recognizer derives a linear area by projecting a position of the linear object onto an image plane of the image and prevents the linear feature matching the linear area from being recognized as the contour of the white line.

(3): In the above-described aspect (1) or (2), the white line recognizer searches for the linear object in a space area corresponding to the recognized linear feature and prevents the linear feature from being recognized as the contour of the white line when the linear object is located in the space area.

(4): In any one of the above-described aspects (1) to (3), an output of the distance measurement sensor is information for enabling a color to be recognized, and the white line recognizer prevents the linear feature corresponding to a position of the linear object of a white color from being recognized as the contour of the white line.

(5): According to another aspect of the present invention, there is provided a mobile object control system including: the white line recognition device according to any one of the above-described aspects (1) to (4); and a control device configured to control movement of a mobile object based on the white line recognized by the white line recognizer.

(6): According to yet another aspect of the present invention, there is provided a white line recognition method executed using a white line recognition device, the white line recognition method including: recognizing a linear feature located in an image captured by a monocular camera as a contour of a white line drawn on a road surface; and detecting a linear object located at a distance from the road surface based on an output of a distance measurement sensor provided to have at least a detection range in the same direction as the monocular camera, wherein recognizing the linear feature includes preventing the linear feature from being recognized as the contour of the white line.

According to the aspects (1) to (6), the misrecognition of white lines can be suppressed.

DESCRIPTION OF EMBODIMENTS

Hereinafter, embodiments of a white line recognition device, a mobile object control system, and a white line recognition method of the present invention will be described with reference to the drawings. The white line recognition device is mounted in, for example, a mobile object. The mobile object moves, for example, both on a roadway and in a prescribed area different from the roadway. The mobile object may be referred to as micromobility. An electric scooter is a type of micromobility. Also, the mobile object may be a vehicle that the occupant can board or may be an autonomous mobile object capable of performing an unmanned autonomous driving process. The latter autonomous mobile object is used, for example, for transporting luggage and the like. Alternatively, the mobile object may be a vehicle or a motorcycle moving exclusively on the roadway. The white line recognition device is particularly preferably applied to a mobile object moving on a sidewalk.

The prescribed area is, for example, a sidewalk. Also, the prescribed area may be some or all of a roadside strip, a bicycle lane, a public open space, and the like or may include all sidewalks, roadside strips, bicycle lanes, public open spaces, and the like. In the following description, the prescribed area is assumed to be a sidewalk. A part described as the "sidewalk" in the following description can be read as the "prescribed area" as appropriate.

Figure 1:
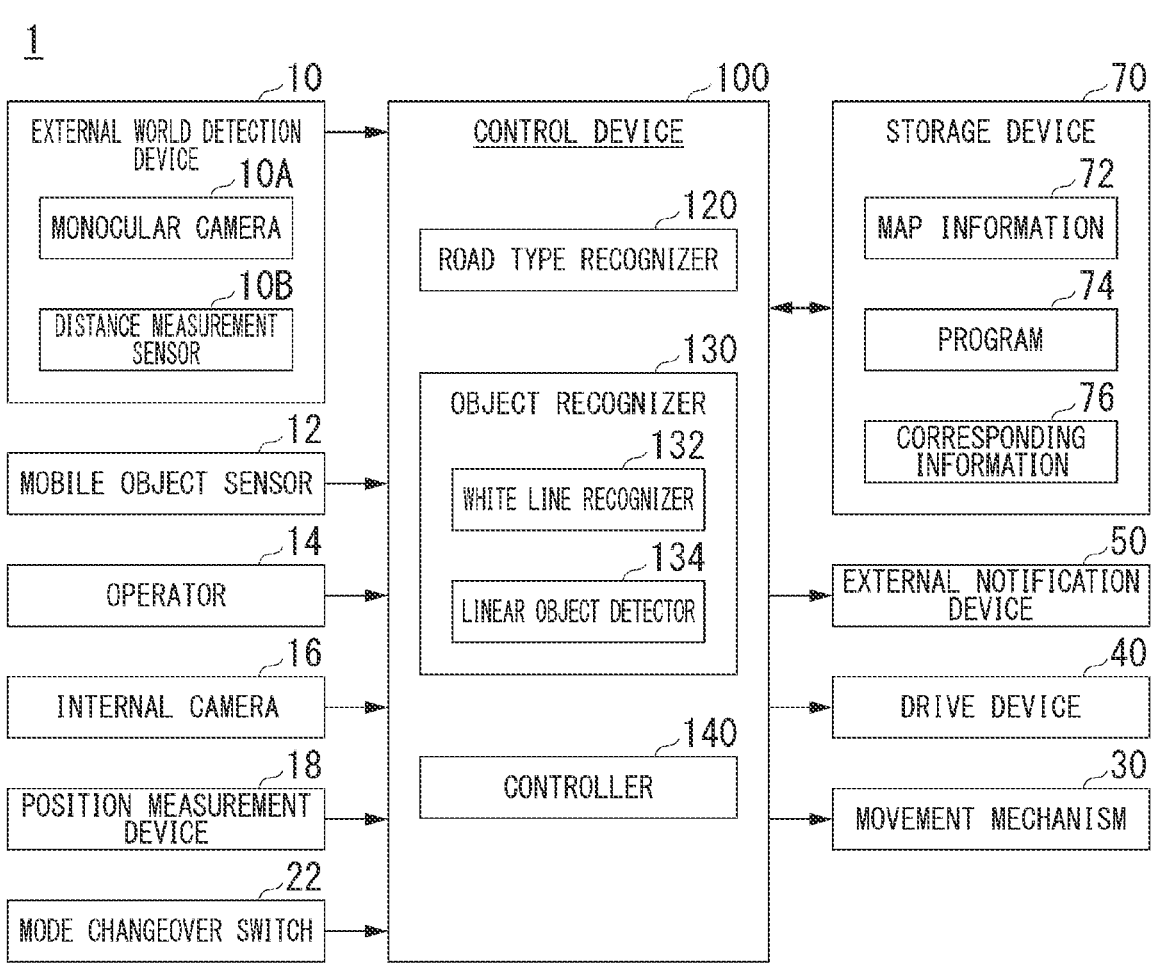
FIG. 1 is a diagram showing an example of a configuration of a mobile object and a control device according to an embodiment.

FIG. 1 is a diagram showing an example of a configuration of the mobile object 1 and the control device 100 according to the embodiment. For example, an external world detection device 10, a mobile object sensor 12, an operator 14, an internal camera 16, a position measurement device 18, a mode changeover switch 22, a movement mechanism 30, a drive device 40, an external notification device 50, a storage device 70, and a control device 100 are mounted in the mobile object 1. Among these components, some components that are not essential for implementing the functions of the present invention may be omitted. The mobile object may include not only a vehicle, but also a small mobility for carrying luggage or guiding a person in parallel with a walking user, and another mobile object capable of moving autonomously (for example, a walking robot).

The external world detection device 10 includes one of various types of devices whose detection ranges are in a traveling direction of the mobile object 1. The external world detection device 10 includes, for example, a monocular camera 10A and a distance measurement sensor 10B. The external world detection device 10 may further include a radar device, a light detection and ranging (LIDAR) sensor, a sensor fusion device, and the like. The external world detection device 10 outputs information (an image, a position of an object, and the like) indicating a detection result to the control device 100.

The monocular camera 10A images a space in a traveling direction of the mobile object 1 and outputs an RGB image or a black and white image. The image output by the monocular camera 10A is obtained by projecting a reflection object within a space into a two-dimensional image space.

The distance measurement sensor 10B uses a space in the same direction as the monocular camera 10A as the detection range and outputs space information. For example, the distance measurement sensor 10B is a stereo camera and the space information is a distance image to which a distance from the distance measurement sensor 10B is added for each pixel (reflection point). The distance image is in the form of an image as a data format, but represents information of a three-dimensional space. The monocular camera 10A may be shared as one camera constituting a stereo camera. Also, the distance measurement sensor 10B is a LIDAR sensor and the space information may be three-dimensional point group data. In any case, color or brightness information may or may not be added to the points (pixels) constituting the space information. In the following description, it is assumed that the distance measurement sensor 10B is a stereo camera.

The mobile object sensor 12 includes, for example, a velocity sensor, an acceleration sensor, a yaw rate (angular velocity) sensor, a direction sensor, and an operation amount detection sensor attached to the operator 14. The operator 14 includes, for example, an operator for issuing an instruction for acceleration/deceleration (for example, an accelerator pedal or a brake pedal), and an operator for issuing an instruction for steering (for example, a steering wheel). In this case, the mobile object sensor 12 may include an accelerator opening degree sensor, a brake depression amount sensor, a steering torque sensor, and the like. The mobile object 1 may include operators other than the above-described operators (for example, a non-annular rotation operator, a joystick, a button, and the like) as the operator 14.

The internal camera 16 images at least the head of the occupant of the mobile object 1 from the front. The internal camera 16 is a digital camera that uses an image sensor such as a charge coupled device (CCD) or a complementary metal oxide semiconductor (CMOS). The internal camera 16 outputs a captured image to the control device 100.

The position measurement device 18 is a device for measuring the position of the mobile object 1. The position measurement device 18 is, for example, a global navigation satellite system (GNSS) receiver, and identifies the position of the mobile object 1 based on a signal received from a GNSS satellite and outputs the identified position as position information. Also, the position information of the mobile object 1 may be estimated from a position of a Wi-Fi base station to which a communication device to be described below is connected.

The mode changeover switch 22 is a switch that is operated by the occupant. The mode changeover switch 22 may be a mechanical switch or a graphical user interface (GUI) switch set on the touch panel. The mode changeover switch 22 receives an operation of switching a driving mode to any one of, for example, mode A, which is an assist mode in which one of a steering operation and acceleration/deceleration control is performed by the occupant and the other is automatically performed and may be mode A-1 in which the steering operation is performed by the occupant and the acceleration/deceleration control is automatically performed and mode A-2 in which an acceleration/deceleration operation is performed by the occupant and steering control is automatically performed, mode B, which is a manual driving mode in which the steering operation and the acceleration/deceleration operation are performed by the occupant, and mode C, which is an automated driving mode in which the steering control and the acceleration/deceleration control are automatically performed.

The movement mechanism 30 is a mechanism for moving the mobile object 1 on a road. The movement mechanism 30 is, for example, a wheel group including a steering wheel and a drive wheel. Also, the movement mechanism 30 may be legs for multi-legged walking.

The drive device 40 outputs a force to the movement mechanism 30 to move the mobile object 1. For example, the drive device 40 includes a motor that drives the drive wheel, a battery that stores electric power to be supplied to the motor, a steering device that adjusts a steering angle of the steering wheel, and the like. The drive device 40 may include an internal combustion engine, a fuel cell, or the like as a driving force output means or a power generation means. Also, the drive device 40 may further include a brake device using a friction force or air resistance.

The external notification device 50 is, for example, a lamp, a display device, a speaker, or the like provided on an outer panel of the mobile object 1 and configured to provide a notification of information to the outside of the mobile object 1. The external notification device 50 performs different operations in a state in which the mobile object 1 is moving on the sidewalk and a state in which the mobile object 1 is moving on the roadway. For example, the external notification device 50 is controlled so that the lamp emits light when the mobile object 1 is moving on the sidewalk and does not emit light when the mobile object 1 is moving on the roadway. The light emission color of this lamp is preferably a color defined by law. The external notification device 50 may be controlled so that the lamp emits green light when the mobile object 1 is moving on the sidewalk and emits blue light when the mobile object 1 is moving on the roadway. When the external notification device 50 is the display device, the external notification device 50 displays text or graphics indicating that "the mobile object 1 is traveling on the sidewalk" when the mobile object 1 is traveling on the sidewalk.

Figure 2:
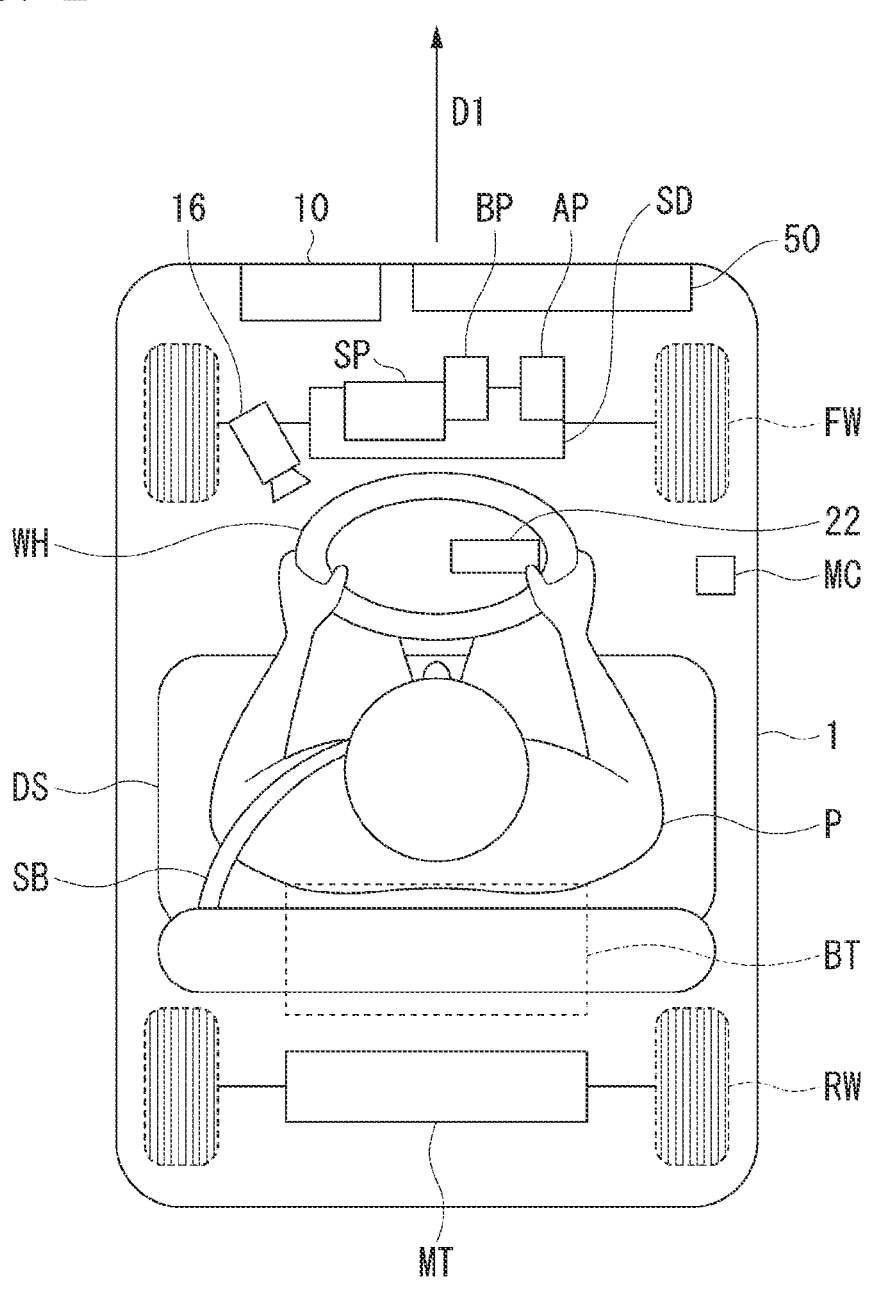
FIG. 2 is a perspective view of the mobile object seen from above.

FIG. 2 is a perspective view of the mobile object 1 seen from above. In FIG. 2, FW denotes the steering wheel, RW denotes the drive wheel, SD denotes the steering device, MT denotes the motor, and BT denotes the battery. The steering device SD, the motor MT, and the battery BT are included in the drive device 40. Also, AP denotes the accelerator pedal, BP denotes the brake pedal, WH denotes the steering wheel, SP denotes the speaker, and MC denotes the microphone. The mobile object 1 shown in FIG. 2 is a single-seater mobile object and an occupant P sits on the driver's seat DS and wears a seat belt SB. An arrow D1 indicates a traveling direction (a velocity vector) of the mobile object 1. The external world detection device 10 is provided near the front end of the mobile object 1, the internal camera 16 is provided at a position where the head of the occupant P can be imaged from the front of the occupant P, and the mode changeover switch 22 is provided on the boss portion of the steering wheel WH. Also, the external notification device 50 serving as a display device is provided near the front end of the mobile object 1.

Returning to FIG. 1, the storage device 70 is a non-transitory storage device such as, for example, a hard disk drive (HDD), a flash memory, or a random-access memory (RAM). The storage device 70 stores map information 72, a program 74 executed by the control device 100, corresponding information 76 to be described below, and the like. Although the storage device 70 is shown outside the frame of the control device 100 in FIG. 1, the storage device 70 may be included in the control device 100. Also, the storage device 70 may be provided on a server (not shown).

[Control Unit]

The control device 100 includes, for example, a road type recognizer 120, an object recognizer 130, and a controller 140. The object recognizer 130 includes a white line recognizer 132 and a linear object detector 134. These components are implemented, for example, by a hardware processor such as a central processing unit (CPU) executing the program (software) 74. Also, some or all of the above components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be pre-stored in the storage device 70 or may be stored in a removable storage medium (a non-transitory storage medium) such as a digital video disc (DVD) or a compact disc (CD)-read-only memory (ROM) and installed in the storage device 70 when the storage medium is mounted in a drive device. An example of a white line recognition device is obtained by combining the white line recognizer 132 and the linear object detector 134. Although the white line recognition device is assumed to have an internal function of the control device 100 in the embodiment, the white line recognition device may be an independent device.

The road type recognizer 120 recognizes whether the mobile object 1 is moving on the roadway or the sidewalk. For example, the road type recognizer 120 recognizes whether the mobile object 1 is moving on the roadway or the sidewalk, for example, by analyzing an image captured by the external camera of the external world detection device

10. Also, outputs of a radar device, a LIDAR sensor, a sensor fusion device, and the like may be used as auxiliaries.

The road type recognizer 120 adds points to a roadway score Sr every time each of a plurality of first events indicating that the mobile object 1 is moving on the roadway is recognized in the image captured by the external camera and recognizes that the moving object 1 is moving on the roadway when the score Sr is greater than or equal to a first threshold value. The first event is, for example, an event (A) in which there are no static obstacles other than a vehicle in a host area (i.e., inside an outer edge of an area where the mobile object 1 is present), an event (B) in which a vehicle is moving in the host area, an event (C) in which there is a road surface marking on a road surface of the host area, an event (D) in which there is a pedestrian crossing in the host area, an event (E) in which the host area is on the lower side of a step, or the like. The road type recognizer 120 weights the number of points according to a confidence level when each of the plurality of first events is recognized and adds the weighted number of points to the roadway score Sr. The number of points corresponding to each of the first events is P1 to Pn (n is a natural number equal to the number of events assumed to be the first event). The number of points P1 to Pn may have the same value or different values in accordance with the type of first event. Also, the weight according to the confidence level of the recognition process is $\alpha1$ to $\alpha n$. The confidence level of the recognition process is incidentally output in the process of recognizing the first event (for example, including a discrimination process using a trained model by machine learning). The roadway score Sr is expressed by Eq. (1).

$$Sr = \alpha1 \times P1 + \alpha1 + P2 + \ldots + \alpha n \times Pn \qquad (1)$$

(If the corresponding first event k is not recognized, Pk=0 (k=1 to n))

However, when any one of a plurality of second events indicating that the mobile object 1 is moving on the sidewalk has been recognized in the image captured by the external camera, the road type recognizer 120 recognizes that the mobile object 1 is moving on the sidewalk regardless of the roadway score Sr. The second event is, for example, an event (a) in which a second surface of a guardrail facing the sidewalk side between two surfaces of the guardrail is imaged by an external camera, an event (b) in which there is a braille block on the road surface of the host area, an event (c) in which there is a static obstacle other than the vehicle in the host area, an event (d) in which the host area is on the upper side with respect to the step, or the like.

The road type recognizer 120 may collate the position information of the mobile object 1 with the map information 72 and recognize whether the mobile object 1 is moving on the roadway or the sidewalk. In this case, the map information needs to have accuracy with which the sidewalk and the roadway can be distinguished from position coordinates. Also, when the "prescribed area" is any area in addition to a sidewalk, the road type recognizer 120 performs a similar process for a roadside strip, a bicycle lane, a public open space, and the like.

The object recognizer 130 recognizes an object located near the mobile object 1 based on the output of the external world detection device 10. The object includes some or all of a mobile object such as a vehicle, a bicycle, or a pedestrian, a road marking, a step, a guardrail, a road shoulder, a runway boundary such as a median strip, a structure installed on the road such as a road sign or a signboard, and an obstacle such as a falling object that exists (falls) on the runway. For example, when an image captured by the external camera of the external world detection device 10 is input, the object recognizer 130 acquires information such as presence, a position, and a type of another mobile object by inputting an image captured by the external camera to a trained model trained to output information such as presence, a position, and a type of an object. Another type of mobile object can also be estimated based on a size in the image, an intensity of a reflected wave received by the radar device of the external world detection device 10, and the like. Also, the object recognizer 130 acquires a speed of another mobile object detected by the radar device using, for example, a Doppler shift or the like. The functions of the white line recognizer 132 and the linear object detector 134 will be described below.

The controller 140 controls, for example, the drive device 40 in accordance with the set operation mode. Although the mobile object 1 may execute only some of the following driving modes, the controller 140 makes a speed limit value different between the cases where the mobile object 1 moves on the roadway and the sidewalk in any case.

In this case, the mode changeover switch 22 may be omitted. In mode A-1, the controller 140 refers to information of the road and the object based on the output of the object recognizer 130, maintains a distance from the object located in front of the mobile object 1 at a certain distance or longer when the mobile object 1 moves on the roadway, and controls the motor MT of the drive device 40 so that the mobile object 1 moves at a first velocity V1 (for example, a velocity that is greater than or equal to 10 [km/h] and less than several tens of kilometers per hour [km/h]) when the distance from the object located in front of the mobile object 1 is sufficiently long. The controller 140 maintains a distance from the object located in front of the mobile object 1 at a certain distance or longer when the mobile object 1 moves on the sidewalk and controls the motor MT of the drive device 40 so that the mobile object 1 moves at a second velocity V2 (for example, a velocity that is less than 10 [km/h]) when the distance from the object located in front of the mobile object 1 is sufficiently long. Such a function is similar to an adaptive cruise control (ACC) function of a vehicle with the first velocity V1 or the second velocity V2 set at a set velocity and the technology used in ACC can be used. Also, in mode A-1, the controller 140 controls the steering device SD so that the steering angle of the steering wheel is changed based on an operation amount of the operator 14 such as the steering wheel. Such a function is similar to that of the power steering device and technology used in a power steering device can be used. Also, electronic control is not performed in relation to steering and the mobile object 1 may have a steering device in which the operator 14 and the steering mechanism are mechanically connected.

In mode A-2, the controller 140 refers to information of a runway and an object based on the output of the object recognizer 130, generates a movable target trajectory by avoiding the object in the runway, and controls the steering device SD of the drive device so that the mobile object 1 moves along a target trajectory. In relation to acceleration/deceleration, the controller 140 controls the motor MT of the drive device 40 based on the speed of the mobile object 1 and the operation amount of the accelerator pedal or the brake pedal. The controller 140 controls the motor MT of the drive device using the first velocity V1 as the upper limit speed when the mobile object 1 is moving on the roadway (in the case of mode A-2, when the upper limit speed is reached, it means that the mobile object 1 is not accelerated even if there is a further acceleration instruction) and controls the drive device 40 using the second velocity V2 as the upper limit speed when the mobile object 1 is moving on the sidewalk.

In mode B, the controller 140 controls the motor MT of the drive device 40 based on the speed of the mobile object 1 and the operation amount of the accelerator pedal or the brake pedal. The controller 140 controls the motor MT of the drive device using the first velocity V1 as the upper limit speed when the mobile object 1 is moving on the roadway (in the case of mode B, when the upper limit speed is reached, it means that the mobile object 1 is not accelerated even if there is a further acceleration instruction) and controls the motor MT of the drive device 40 using the second velocity V2 as the upper limit speed when the mobile object 1 is moving on the sidewalk. In relation to steering, mode B is similar to mode A-1.

In mode C, the controller 140 refers to information of a runway and an object based on the output of the object recognizer 130, generates a movable target trajectory by avoiding the object in the runway, and controls the drive device 40 so that the mobile object 1 moves along a target trajectory. Even in mode C, the controller 140 controls the drive device 40 using the first velocity V1 as the upper limit speed when the mobile object 1 is moving on the roadway and controls the drive device 40 using the second velocity V2 as the upper limit speed when the mobile object 1 is moving on the sidewalk.

[White Line Recognition]

Hereinafter, the functions of the white line recognizer 132 and the linear object detector 134 will be described. For example, the white line recognizer 132 extracts a horizontal edge having a brightness difference in the left and right directions greater than or equal to a threshold value in an area of interest in the captured image of the monocular camera 10A, recognizes a horizontal edge arranged in a straight or curved shape as a straight line or a curve, and detects a linear feature extending toward an upper dead point of the image as a white line contour candidate. Also, the white line recognizer 132 recognizes an area surrounded by contour candidates and whose width in a short direction is within a range assumed to be a white line as a white line and outputs information obtained by projecting a position of the white line onto a virtual plane seen from above the mobile object 1 from the image plane of the captured image to the controller 140.

Figure 3:
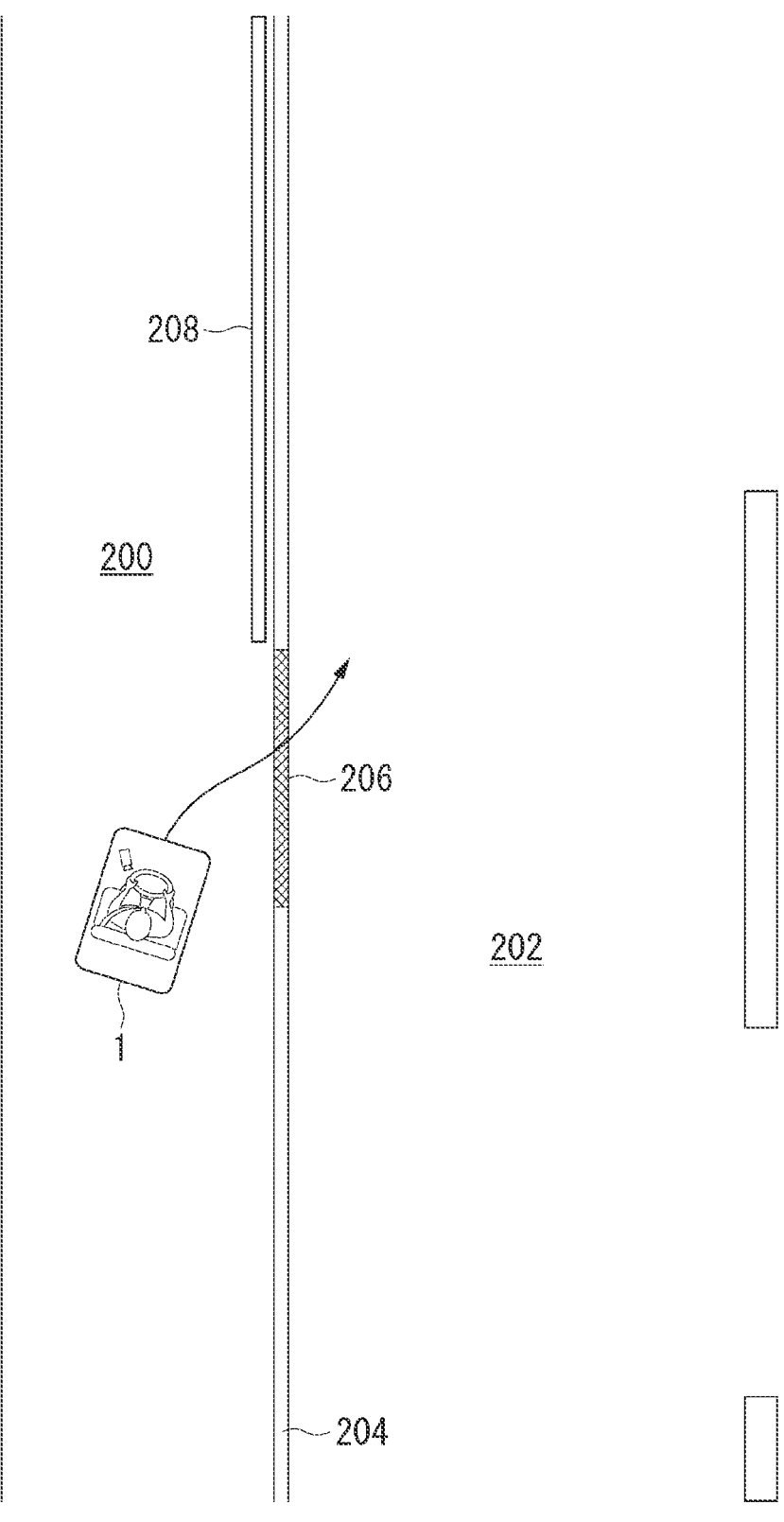
FIG. 3 is a diagram showing a situation in which a white line drawn on a roadway is recognized over a boundary between a sidewalk and the roadway.

Here, a situation in which the mobile object 1 is able to move on the sidewalk and is about to move from the sidewalk to the roadway is assumed. Accordingly, in the mobile object 1, a situation in which a white line drawn on the roadway is recognized over a boundary between the sidewalk and the roadway may occur. FIG. 3 is a diagram illustrating such a situation. In this situation, the mobile object 1 is moving on the sidewalk 200 and is about to move to the roadway 202 through a connection portion 206 where a step 204 provided between the sidewalk 200 and the roadway 202 is relaxed. A guard pipe 208 is provided on the sidewalk side of the step 204. The guard pipe 208 is a thin fence provided at the boundary between the sidewalk and the roadway. In addition to such a situation, it is assumed that the mobile object 1 moves from the roadway to the sidewalk and then moves to the opposite roadway. Thus, in the mobile object 1, a case where a white line is recognized in a space involving a sidewalk occurs.

Figure 4:
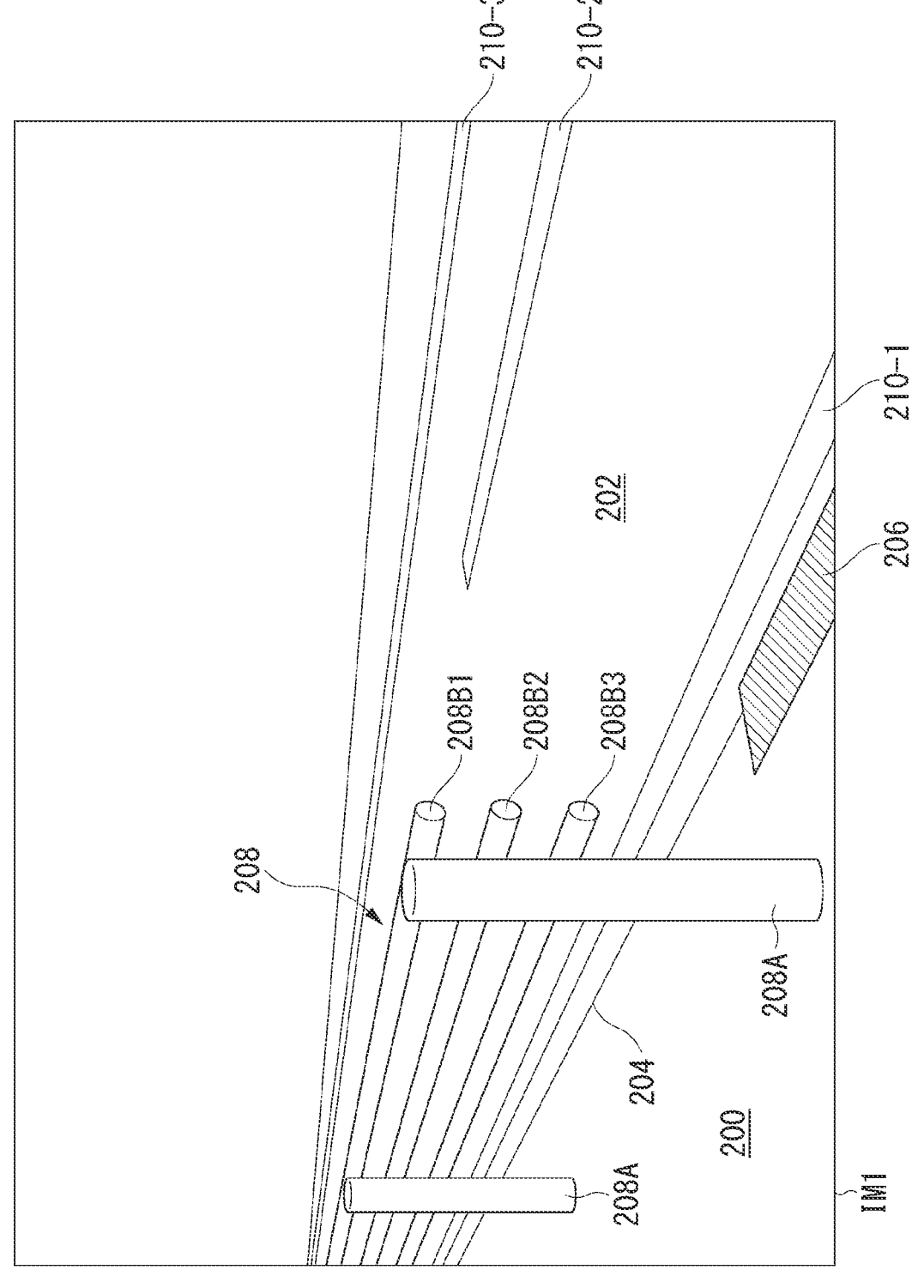
FIG. 4 is a diagram showing an example of a captured image IM1 captured by a monocular camera of the mobile object in the situation shown in FIG. 3.

FIG. 4 is a diagram showing an example of a captured image IM1 captured by the monocular camera 10A of the mobile object 1 in the situation shown in FIG. 3. The guard pipe 208 includes, for example, a plurality of supports 208A and one or more main pipes 208B (three pipes 208B1, 208B2, and 208B3) suspended horizontally between the supports 208A. The captured image IM1 shows three white lines 210-1, 210-2, and 210-3 (the white line 210-2 is a dashed line). Each of the main pipes 208B is easily confused with a white line in a computer image process because (1) the main pipe 208B extends along the road, (2) the width of the main pipe 208B seen from the sidewalk is close to that of the white line, and (3) the main pipes 208B are white usually. For this reason, after movement from the sidewalk 200 to the roadway 202, positions of the left and right white lines 210-1 and 210-2 that should be used as a reference for the movement control of the mobile object 1 at the time of movement within the roadway 202 may not be correctly recognized.

Therefore, in the embodiment, the linear object detector 134 detects a linear object located (floating in the air) at a distance from the road surface and the white line recognizer 132 prevents a linear feature corresponding to the position of the linear object from being recognized as a contour of the white line, such that the occurrence of misrecognition in white line recognition is suppressed with respect to an object easily confused with the white line such as the main pipe 208B. The term "preventing the linear feature from being recognized as the contour of the white line" indicates that the linear feature is not recognized as the contour of the white line in principle, and for example, it is assumed that the position of the white line seen from the monocular camera 10A and the linear object overlap by chance when only the intermediate portion of the linear feature corresponds to the position of the linear object and both ends thereof do not correspond to the position of the linear object. In such a case, the white line recognizer 132 does not immediately determine that "it is not the contour of the white line," but it may be recognized as the contour of the white line if the probability of the contour of the white line is sufficiently high from the connection with the surroundings. Hereinafter, the term "preventing the linear feature from being recognized as the contour of the white line" is also referred to as "excluding the linear feature from recognition results."

The linear object detector 134 detects a linear object based on the space information output by the distance measurement sensor 10B with reference to the corresponding information 76 stored in the storage device 70.

When the space information is in the form of a distance image (hereinafter referred to as a space information image), the corresponding information corresponds to each of the coordinates of the space information image and is information indicating a distance when the road surface is detected as a light reflection point (hereinafter, reference distance 1). In this case, the linear object detector 134 extracts coordinates whose distance is less than reference distance 1 from the coordinates of the space information image and detects a target including a group of coordinates extending in a straight or curved shape at a prescribed width as a linear object.

When the space information is in the form of a three-dimensional point group, the corresponding information is information indicating a direction (a direction angle, a depression angle, or an elevation angle) seen from the distance measurement sensor 10B and a distance when it is assumed that the road surface is detected as a light reflection point (hereinafter referred to as reference distance 2). In this case, the linear object detector 134 extracts a point whose distance is less than reference distance 2 from points constituting the three-dimensional point group and detects a target including a group of points extending in a straight or curved shape at a prescribed width as a linear object.

Also, when the space information includes color information and when the linear object detector 134 detects a non-white linear object, the white line recognizer 132 may not perform a process of specifically excluding the non-white linear object from the recognition result. This is because the non-white linear object is less likely to be confused with white lines.

Figure 5:
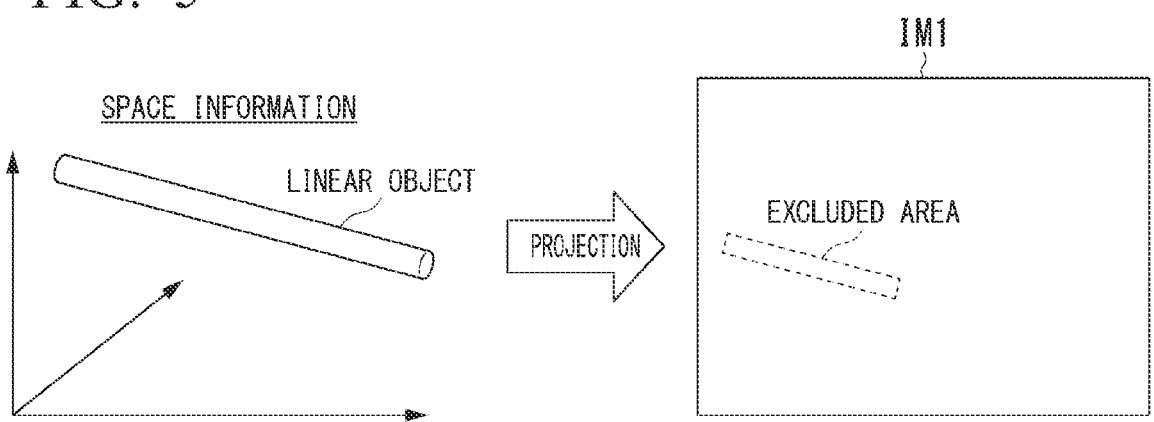
FIG. 5 is a diagram for describing method 1.

For example, the following two methods can be considered as a method of excluding a linear feature corresponding to a position of a linear object from the recognition result. (Method 1) For example, the white line recognizer 132 projects the position of the linear object onto an image plane of a captured image IM1 to derive a linear area and excludes the linear feature matching the linear area from the recognition results. FIG. 5 is a diagram for describing method 1. The parameters necessary for projection are a mounting position, an optical axis direction, a distortion degree, and the like of the monocular camera 10A and a mounting position, an optical axis direction, a distortion degree, and the like of the distance measurement sensor 10B and the white line recognizer 132 performs the projection using a function for the projection obtained from a physical relationship thereamong. The position of the linear object may be expressed by the coordinate axis of the space information image or may be expressed by the coordinate axis of the three-dimensional space. In any case, it is possible to acquire information indicating "where a linear object is if it is on the captured image IM1" by projecting the linear object onto the image plane of the captured image IM1.

Figure 6:
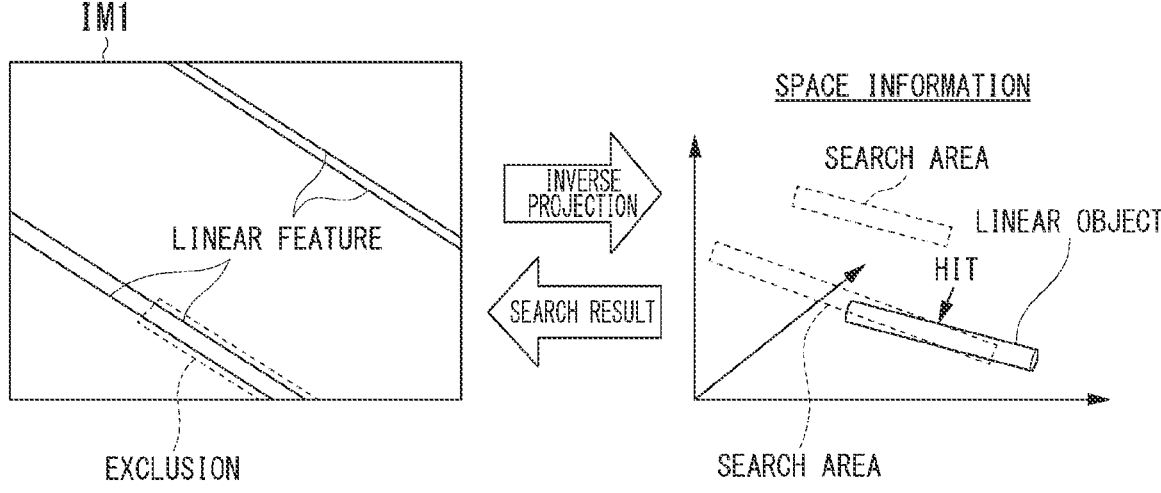
FIG. 6 is a diagram for describing method 2.

(Method 2) The white line recognizer 132 searches for a linear object in the space area (an area on the coordinate axis constituting the space information; acquired by performing an inverse process of the above-described projection) corresponding to the white line on the recognized captured image IM1 and excludes a linear feature from a recognition result when there is a linear object in the space area. FIG. 6 is a diagram for describing method 2. As shown in FIG. 6, the white line recognizer 132 searches whether or not there is a linear object in a search area obtained by inversely projecting the position of the linear feature in the captured image IM1 onto the space information and excludes the linear feature corresponding to a hit search area from the recognition result when there is a linear object.

The white line recognition result in which misrecognition is reduced by excluding the linear object in this way is used for controlling the drive device 40 by the controller 140. For example, in mode A-2 or mode C, the controller 140 generates a target trajectory within a lane partitioned by the recognized white line.

According to the above-described embodiment, the white line recognizer 132 configured to recognize a white line drawn on a road surface in the captured image IM1 captured by the monocular camera 10A and the linear object detector 134 configured to detect a linear object located at a distance from the road surface based on an output of the distance measurement sensor 10B provided to have at least a detection range in the same direction as the monocular camera 10A are provided. The white line recognizer 132 can suppress the misrecognition of the white line because the white line corresponding to the position of the linear object is excluded from a recognition result.

Although modes for carrying out the present invention have been described above using embodiments, the present invention is not limited to the embodiments and various modifications and substitutions can also be made without departing from the scope and spirit of the present invention.

What is claimed is:

1. A white line recognition device comprising:

a storage medium storing computer-readable instructions; and a processor connected to the storage medium, the processor executing the computer-readable instructions to:

recognize a linear feature located in an image captured by a monocular camera as a contour candidate of a white line drawn on a road surface, detect a three-dimensional linear object positioned at a boundary between a sidewalk and a roadway and located at a distance from the road surface based on an output of a distance measurement sensor provided to have at least a detection range in the same direction as the monocular camera, derive a linear area by projecting a position of the three-dimensional linear object onto an image plane of the image, recognize a contour of the white line by excluding a linear feature matching the linear area from the contour candidate off the white line, and control a mobile object to travel between the roadway and the side walk via the boundary based on the contour of the white line.

2. The white line recognition device according to claim 1, wherein an output of the distance measurement sensor is information for enabling a color to be recognized, and wherein the processor recognizes the contour of the white line by excluding a linear feature matching the linear area based on the three-dimensional linear object of a white color from the contour candidate of the white line.

3. A white line recognition method executed using a white line recognition device, the white line recognition method comprising:

recognizing a linear feature located in an image captured by a monocular camera as a contour candidate of a white line drawn on a road surface;

detecting a three-dimensional linear object positioned at a boundary between a sidewalk and a roadway and located at a distance from the road surface based on an output of a distance measurement sensor provided to have at least a detection range in the same direction as the monocular camera;

deriving a linear area by projecting a position of the three-dimensional linear object onto an image plane of the image;

recognizing a contour of the white line by excluding a linear feature matching the linear area from the contour candidate of the white line; and controlling a mobile object to travel between the roadway and the sidewalk via the boundary based on the contour of the white line.

4. A white line recognition device comprising:

a storage medium storing computer-readable instructions; and a processor connected to the storage medium, the processor executing the computer-readable instructions to:

recognize a linear feature located in an image captured by a monocular camera as a contour candidate of a white line drawn on a road surface, detect a three-dimensional linear object positioned at a boundary between a sidewalk and a roadway and located at a distance from the road surface based on an output of a distance measurement sensor provided to have at least a detection range in the same direction as the monocular camera, inversely projecting a position of the linear feature in a space area, search for the three-dimensional linear object in the space area, when there is the three-dimensional linear object in the space area, recognize a contour of the white line by excluding the linear feature from the contour candidate of the white line, and control a mobile object to travel between the roadway and the sidewalk via the boundary based on the contour of the white line.

* * * * *